Sept. 10, 1940. J. H. VERNON 2,214,516
MEANS FOR SUPPORTING CAMERAS ON VEHICLES
Filed June 10, 1938
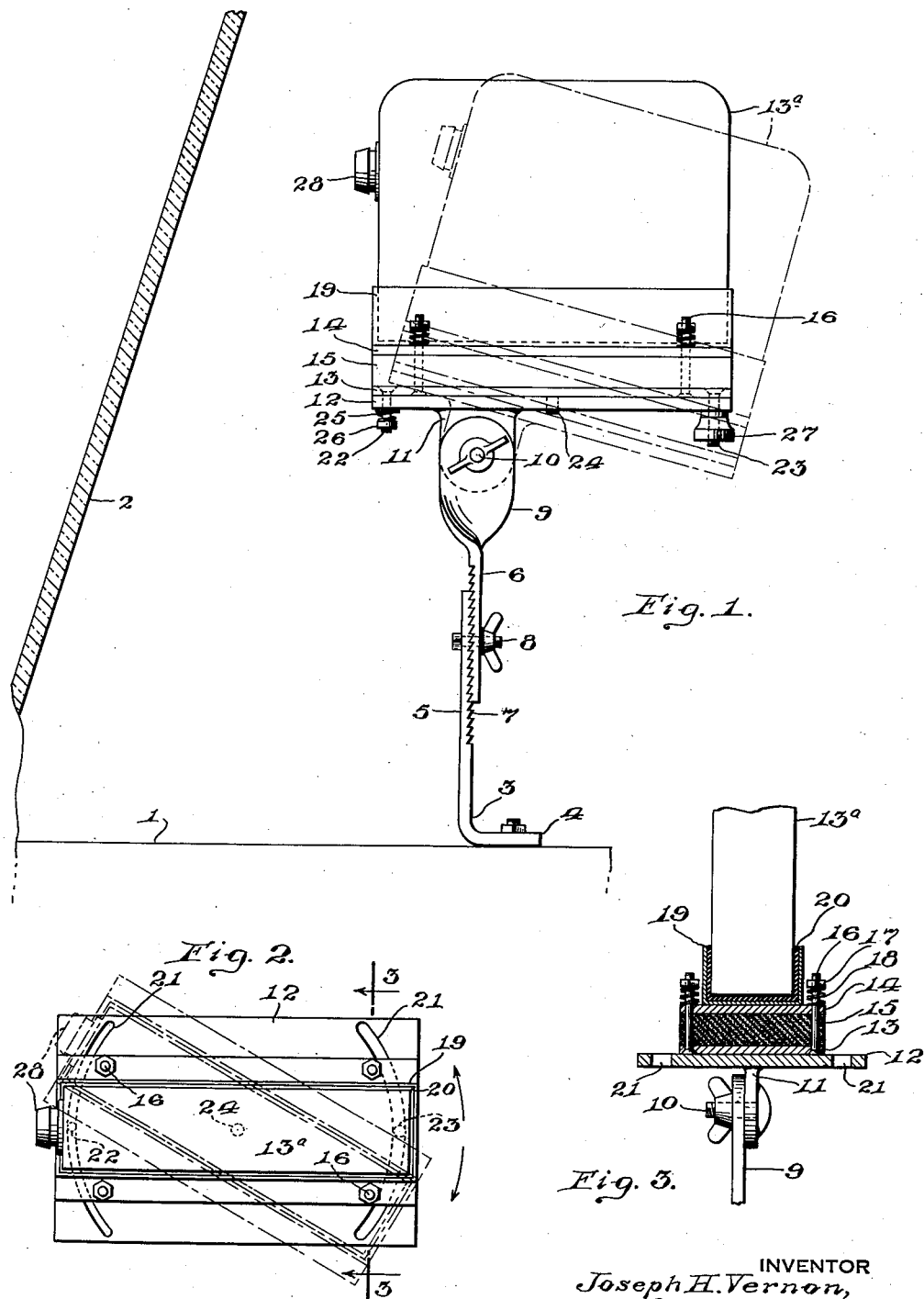
INVENTOR
Joseph H. Vernon, Patented Sept. 10, 1940

2,214,516

UNITED STATES PATENT OFFICE 2,214,516

MEANS FOR SUPPORTING CAMERAS ON VEHICLES

Joseph H. Vernon, Philadelphia, Pa.

Application June 10, 1938, Serial No. 213,068

1 Claim. (Cl. 248—183)

The object of the invention is to provide improvements in holders for cameras, but more particularly in a type of holder which is especially adapted for use in automobiles and similar vehicles, for operatively supporting cameras so as to permit the taking of pictures, both still and motion, while the vehicle is in motion as well as when stationary.

Another object is to provide a holder which is so adjustable, that the axis of the lens can be raised and lowered at will, can be tilted angularly forwardly and rearwardly, and can be angularly adjusted horizontally about a vertical axis.

A further object is to provide in such a device means to absorb at least a major portion of the vibrations or shocks due to unevenness of the road upon which the vehicle is traveling, in the case of taking moving pictures while such vehicle is in motion, and also to absorb the vibrations caused by the automobile engine while idling and the vehicle itself is at rest.

Still another object is to provide a simplified means for operatively securing a camera to the improved holder, so that the surfaces of the camera will not become abraded or otherwise damaged, and which means will permit the ready removal of the camera at will from the support, without involving the use of screws, bolts, clamps and the like.

With the objects thus briefly stated, the invention comprises further details of construction and operation, which are hereinafter fully brought out in the following description, when read in conjunction with the accompanying drawing, in which Fig. 1 is a side elevational view of a holder comprising one embodiment of the invention, together with a representative form of camera operatively supported thereby, and to the rear of the usual windshield of the vehicle; Fig. 2 is a top plan view of the improved holder and the camera carried thereby; and Fig. 3 is a vertical sectional view on the line 3—3 of Fig. 2.

Referring to the drawing, a vehicle such as an automobile is represented diagrammatically by the base 1, from which extends angularly upwardly the usual windshield 2. Depending upon the position, shape and direction of said base, the lowermost fixed section 3 of the improved bracket comprises any suitable shape of foot 4, or other terminal portion, which is adapted to be securely fixed to said base, whether such base comprises a portion of the dash, the instrument board, or other part of the vehicle in question.

The fixed section 3 of the improved bracket further comprises a generally upwardly extending arm 5, to which is preferably slidably connected a longitudinally adjustable intermediate section 6, the adjacent contacting surfaces of said sections being smooth, corrugated, saw-toothed as shown at 7, or otherwise, and said sections being normally secured together by means of a suitable form of bolt 8 or the like. The upper portion of said intermediate or second section is provided with a relatively flat angularly positioned extension 9, to which by means of a bolt 10 or the like is adjustably secured, in any desired angular position, a depending ear or lug 11, preferably comprising an integral downward extension from a transversely extending table-like head section 12, which in turn provides a platform upon and to which the camera 13a can be indirectly mounted and secured.

Resting directly upon the upper surface of the head section 12 is a metallic plate 13, above and in spaced relation with which is positioned a substantially parallel second plate 14, said plates being separated by means of sponge rubber or other resilient shock absorbing or insulating means 15, while said plates and the intervening rubber element are connected together and transversely fixedly positioned by means of a plurality of spaced pins, or the like, which may take the form of bolts 16, secured to the lower plate 13 and extending loosely through the upper plate 14. Also surrounding such pins or bolts and adjustably tensioned by means of nuts 17 are springs 18, which operate to prevent said plates from separating a greater distance than they may be forced apart by the said intervening rubber element 15, when under little or more compression than is exerted by the weight of the camera superimposed upon the second or upper plate.

A holder for said camera is made to comprise a hollow box-like member 19, which is directly secured to the upper surface of the second plate 14 and is lined with felt, rubber or other suitable medium 20, by which said camera is yieldingly gripped frictionally, so as to secure said camera in substantially fixed relation with the upper plate 14, in order to move unitarily therewith but at the same time permit said camera to be detached at will from such holding member 19, without abrading or in any way injuring said camera or its surface during its attachment to or detachment from the improved holder as a unit. It will be noted that the head section 12 is provided with one or more concentric arcuate slots 21 through which extend pins, bolts, or the like 22 and 23, respectively, which bolts, together with a pivot pin 24, also carried by the lower plate 13 and extending into or through the head 12, operate to permit horizontal angular adjustment of the camera with respect to the lower sections of the bracket. Preferably surrounding the forward pin 22 is a spring 25 which, together with a normally fixed though adjustable head 26, serves to maintain the forward portion of the plate 13 in close sliding contact with the surface of the bracket head 12, but without causing these parts to bind together. On the other hand, the rear pin or bolt 23 is provided with a knurled thumb nut 27 or the like, by means of which the said plate 13 and, through the superimposed portions of the bracket, the camera as well are maintained in normally fixed, though in any desired adjustable angular position.

Having provided this structure, it becomes readily obvious that the height of the camera may be varied by adjusting the longitudinal relationship between the bracket sections 5 and 6; the vertical angle of the axis of the lens 28 of the camera may be varied by adjusting the angular relationship between the head 9 of the intermediate section and the cooperating lug or ear 11; and the horizontal angular position of said lens axis may be varied by adjusting the position of the plate 13 and superimposed parts of the holder upon and with respect to the platform of the head section 12. Thus, either when the vehicle is stationary, or when it is traveling along a given road surface, the camera of either the still or the motion picture variety may be so arranged and operated as to take photographs in any angular position with respect to the path or direction of movement of the said vehicle.

It is also to be understood that various minor changes may be made in the details of the construction and operation of the improved bracket without departing from the scope of the invention. For purposes of illustration, an alternative form of bracket may comprise a base section, which can be mounted upon and demounted from a vehicle at will, but which is fixedly secured thereto during normal use, together with a table or turret-like head carried by said base section, and to which a camera is normally secured, in such manner that it can be angularly adjusted in either or both substantially vertical and horizontal planes, in a way similar to that hereinbefore described, and preferably in combination with vibration-insulating or shock-absorbing means, such as is also hereinbefore referred to.

Having thus described my invention, what I claim as new and desire to protect by Letters Patent of the United States is:

A camera holder comprising a fixed section secured to a support therefor, an intermediate section adjustable with respect to said fixed section, a head section angularly adjustable with respect to said second section in a vertical plane, a receptacle to receive a camera, cushioning means frictionally engaging and operatively securing a camera in said receptacle and means to angularly adjust said receptacle in a horizontal plane with respect to said head section.

JOSEPH H. VERNON.